Figure 1:
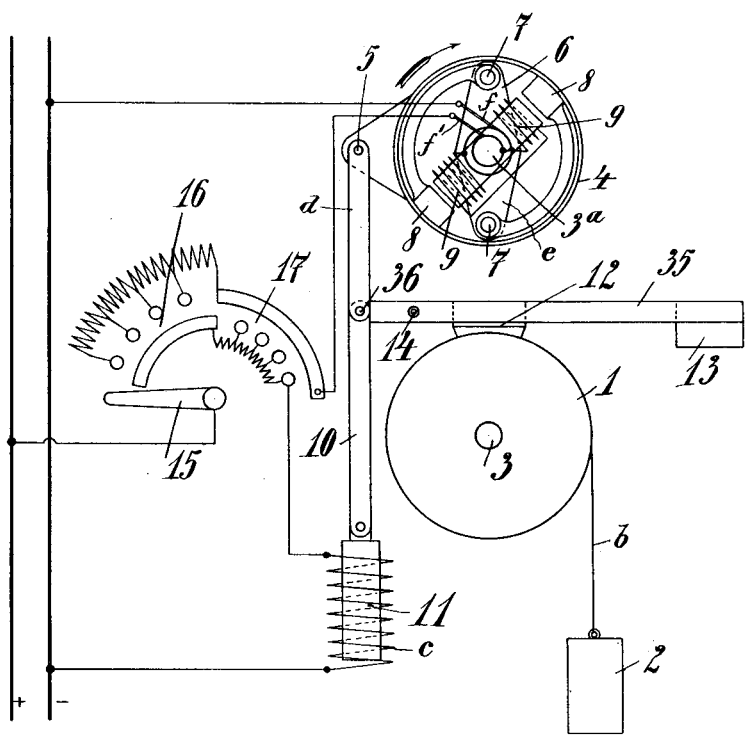

A. HOFFMANN.
BRAKE.
APPLICATION FILED JUNE 22, 1909.

1,119,282.

Patented Dec. 1, 1914.
2 SHEETS—SHEET 1.

Witnesses.

Inventor.

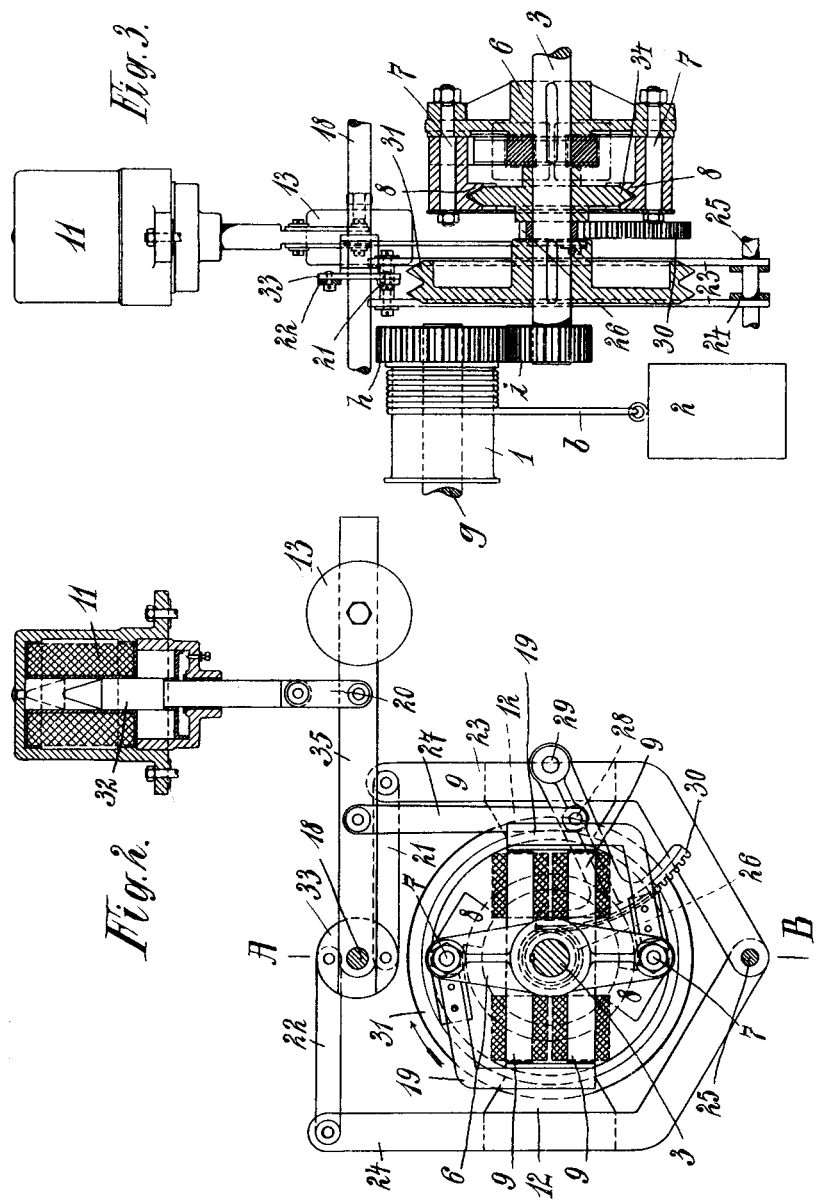

UNITED STATES PATENT OFFICE.

ALEXANDER HOFFMANN, OF BERLIN, GERMANY, ASSIGNOR TO THE FIRM OF E. BECKER, MASCHINENFABRIK, OF BERLIN, GERMANY.

BRAKE.

1,119,282. Specification of Letters Patent. Patented Dec. 1, 1914.

Application filed June 22, 1909. Serial No. 503,627.

*To all whom it may concern:*

Be it known that I, ALEXANDER HOFFMANN, a subject of the Emperor of Russia, residing at and whose post-office address is 7 Immanuelkirchstrasse, Berlin, Germany, have invented certain new and useful Improvements in Brakes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to differential brake mechanism, especially adapted for hoisting and similar engines in which the element to be braked is acted upon by opposed braking devices, one of which devices is dependent upon the speed of the machine and more especially of the descent of the load and the other of which devices is suitably positively controlled. The braking effect of the coöperating devices being equal to the difference of the braking action of the two opposed devices.

Referring to the drawings in which like parts are similarly designated; Figure 1 is a simple diagrammatical view illustrating the principle and operation of the brake mechanism. Fig. 2 is a side elevation partly in section of a brake mechanism constructed in accordance with my invention and Fig. 3 is a section taken on the line A—B of Fig. 2.

Referring to the diagram, Fig. 1, the winding drum 1 of the hoisting engine is mounted on a shaft 3, on which drum is wound the rope $b$ carrying the load 2. Acting to brake the drum is a brake 12 carried by a brake lever 35 pivoted at 14 and carrying a weight 13 on its longer arm. The other end of the lever or shorter arm thereof is connected by a link 10 to an electromagnet core 11 whose solenoid or winding $c$ is connected at one end to one of the line wires of a suitable source of electricity, here shown as the negative wire and the other end of the coil or winding being connected to the other line wire of said source, through resistance boxes 16, 17, preferably but not necessarily in series, and lever 15. The pivot point 36 is also connected by a link $d$ to an arm 5 of a brake drum 4, said brake drum being acted upon by brake shoes 8 pivoted at 7 to arms 6 fixed on a shaft $3^a$, said shaft $3^a$ being either a continuation of shaft 3 or it may be geared or otherwise operatively connected thereto. Proximate the brake shoes 8 are solenoids or electro magnets 9 supplied with current by brushes $f, f'$, the one of which is directly connected to the aforesaid negative wire of the source of electricity and the other indirectly connected to the positive wire thereof through the series resistances or controller boxes 16, 17, and pivoted arm 15 which is connected to the positive wire of source of electricity. The electromagnets 9 are in series. By energizing the magnet 11 the lever 35 will be lifted from the brake drum 1 permitting the drum to rotate under the influence of its load 2 whereupon the shaft $3^a$ connected to the shaft 3 of the drum or geared thereto as the case may be, is rotated, and the rotation thereof causes the brake shoes 8 to swing on their pivot 7 and move into contact with their brake drum 4 and have a tendency to move this brake drum into the direction of the arrow thereby causing a pull on the link $d$ in opposition to the pull on link 10. The difference between the two being utilized in controlling the movement of lever 35 and thereby controlling the braking effect on drum 1, and maintaining a uniform speed of drum 1 and a uniform lowering of the load 2.

The braking effect of the shoes 8 on the drum 4 may be decreased by their attraction to the electromagnets, 9, the amount of this attraction being controlled through the resistance box 16. The resistance to the electric current through both of the series magnets 9 and through the winding $c$ being greatest when the arm 15 bridges the left hand contacts of resistance box 16 and this resistance is gradually decreased as the arm 15 moves clockwise to the right. The variation of pressure or the friction of the shoes 8 against drum 4 can consequently be varied between large limits by reason of the electromagnets 9, and the speed of the descent of the load whatever this load may be can be maintained constant under all conditions of operation and may be varied to any extent within wide limits by reason of the electric control. As the speed of descent of the load 2 increases the centrifugal force increases the friction of the brake shoes 8 and consequently automatically effects a greater braking through the brake drum and link *d* acting on lever 35. The braking effect on the drum 1 is dependent on the difference between the pull of the electromagnet *c*, 11, and of the centrifugal brake mechanism. Thus it will be seen that there are two oppositely operating braking devices whose differential force acts to brake the drum, one of which devices is dependent upon the speed of rotation of the drum and the other is hand controlled, and in addition thereto the braking effect of the mechanism controlled by the rotation of the drum may be additionally and positively controlled.

Referring now to Figs. 2 and 3 which show a practical embodiment of my invention, operating in accordance with the aforesaid diagram, *g* is a shaft to which the hoisting drum 1 is keyed or otherwise fastened, said drum being provided with a hoisting rope or the like *b* for the load 2. The shaft *g* or it may be the drum 1 is provided with a gear wheel *h* that meshes with a pinion *i* on shaft 3, or it may be that the shaft *g* forms a continuation of the shaft 3 thus omitting the gearing between them.

Keyed to the shaft 3 is a brake wheel or drum 31 against which act brake shoes 12 secured to brake arms 23 and 24 respectively, said brake arms being mounted to pivot on a fixed pivot point or rod 25. The brake shoes 12 are diametrically opposite one another. The brake arms 23 and 24 are connected by links 21 and 22 respectively to a disk 33 on the shaft 18. Rigidly connected to the disk 33 or to the shaft 18 as the case may be, is a weight arm 35 carrying an adjustable weight 13. The electromagnet 11 is provided with a core 32 connected by a link 20 to the weight arm 35. When the electromagnet is energized the core 32 is raised thereby slightly rotating arm 35 and disk 33 to release the brake shoes 12 from the brake wheel 31. Secured to shaft 3 is an arm 6 carrying pins 7 on which are loosely mounted the centrifugal brake shoes 8 capable of contacting with a brake wheel or drum 34. The brake shoes 8 are loaded so as to be normally out of contact with the brake drum by means of approximately right angle lever arms 19, said lever arms forming the armatures of electromagnets 9 whose metallic cores are secured to or form part of the arm 6.

A brake drum or wheel 34 is mounted loose on the shaft 3, and connected therewith is a pinion 26 gearing with a toothed sector 30, which toothed sector is pivotally mounted at 29 on the brake arm 23 and intermediate the pivot point 29 and the tooth crown of the sector 30, this sector is pivotally connected at 28 to the end of a link 27 whose other end is pivotally connected to the weight arm 35.

The operation of the device is as follows: When it is desired to allow the load to descend, current is sent to the electromagnet 11 whereby the weight arm 35 is raised and the brake shoes 12 are released to a greater or less degree from their clutching position against the brake wheel or drum 31. The load then descends and the speed of rotation of the drum 1 is transmitted through gears *h* and *i* to shaft 3, thereby causing the centrifugal brake shoes 8 to engage the brake disk or drum 34 whereupon the drum 34 carries with it the pinion 25 to operate the sector 30 moving this downward and consequently exerting a pull on link 27 and weight arm 35 contrary to the pull on said arm by the electromagnet 11, until a balance of force is obtained, whereupon the load 2 will be allowed to descend at uniform speed by reason of the braking force being applied to the main brake drum 31 proportional to the speed of descent of the load, depending of course on the current which controls for the time being the electromagnet 11. The centrifugal brake device, to wit, the brake shoes 8, may be controlled by controlling the current to the series electromagnets 9 and also by controlling the current of the electromagnet 11 either simultaneously or independently.

The mechanism herein described may be altered in many ways and the main brake member 31 may be assembled with relation to the auxiliary brake member 34 and the hoisting drum in any desired manner so long as there is a differential braking force exerted on the drum 1. The electromagnets 9 can of course be placed on the lever arms 19 if desired. The brake shoes and particular drum as herein shown, may be replaced by a suitable band brake and drum.

I claim:—

1. In combination, a friction member, shoes urged by their own centrifugal action to engage said member and electro-magnetic means acting on said shoes in opposition to said centrifugal action and regulable during operation.

2. A braking mechanism comprising a rotary member whose rotation is to be braked, two independent braking devices coöperating to retard the rotation of said member, one of which braking devices is dependent on the speed of rotation of the member and the other of which is suitably controlled, and auxiliary mechanism to control the braking device depending on the speed of rotation of the drum.

3. In combination a friction member, a shaft, shoes to engage the member by centrifugal action and rotating with the shaft and electro-magnetic mechanism carried by the shaft to exert force on the shoes in opposition to the centrifugal action and regulable during operation.

4. A braking mechanism comprising a rotary member whose speed of rotation is to be braked, two independent braking devices coöperating to retard the rotation of said member, one of which braking devices is dependent on the speed of rotation of the member and the other of which is suitably controlled whereby a differential braking force is exerted on the drum, and electromagnetic mechanism to reduce the braking effect of the braking mechanism, dependent upon the rotation speed of the member.

5. A braking mechanism comprising a rotary member whose speed of rotation is to be braked, two independent braking devices coöperating to retard the rotation of said member, one of which braking devices is dependent on the speed of rotation of the member, electromagnetic mechanism to suitably control the other of said braking devices, electromagnetic mechanism to reduce the action of the braking device dependent on the rotation speed of said member and means to simultaneously control both of said electromagnetic mechanisms.

6. In combination, a main brake drum, means to frictionally contact therewith, means to control said contact means, an independent centrifugal brake device, a pinion actuated thereby, a sector meshing with the pinion and means to connect said sector with the contact means to operate in opposition to the means which control the contact means.

7. In combination, a main brake drum, shoes to contact therewith, a pivoted weight arm operatively connected to the shoes to maintain them in contact with the drum, an independent centrifugal braking device rotatable in unison with the drum, including a brake disk and pinion independently movable with respect to the drum, a sector in engagement with the pinion and means to connect the weight arm and sector.

8. In combination a friction drum whose speed is to be controlled, shoes, weight actuated lever mechanism to apply the shoes to the drum, an electro-magnetic device acting on and in opposition to the weight controlled lever mechanism, a centrifugal brake mechanism, electro-magnetic mechanism carried by the latter to reduce the centrifugal braking action and means to operatively connect the centrifugal braking mechanism and lever mechanism.

9. The combination with a rotating member, of shoes urged by their own centrifugal action into frictional engagement with said member, means rotating in unison with said shoes for exerting a negative force on the shoes, means to control said force exerting means during the rotation of said member and shoes and thereby control the force exerted.

10. In combination, a friction member, shoes urged by centrifugal action to engage said member, electromagnetic means to act on the shoes, and means to control the action of said electro-magnetic means during the operation of the combination.

11. In combination, a friction ring, shoes urged by centrifugal action to slide along said ring, electromagnetic means acting in opposition to said centrifugal action on the shoes, and means to control the action of said electromagnetic means during operation.

In testimony that I claim the foregoing as my invention, I have signed my name in presence of two subscribing witnesses.

ALEXANDER HOFFMANN.

Witnesses:
HENRY HASPER,
WOLDEMAR HAUPT.